United States Patent
Agarwal et al.

(10) Patent No.: US 7,114,037 B2
(45) Date of Patent: Sep. 26, 2006

(54) EMPLOYING LOCAL DATA STORES TO MAINTAIN DATA DURING WORKFLOWS

(75) Inventors: Sachin Agarwal, Santa Clara, CA (US); Thomas Remahl, Los Altos, CA (US); Joan Teng, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 540 days.

(21) Appl. No.: 10/345,873

(22) Filed: Jan. 16, 2003

(65) Prior Publication Data

US 2004/0010665 A1    Jan. 15, 2004

Related U.S. Application Data

(60) Provisional application No. 60/395,152, filed on Jul. 11, 2002.

(51) Int. Cl.
*G06F 12/08* (2006.01)
(52) U.S. Cl. ................................ 711/143
(58) Field of Classification Search ........ 711/143, 711/154
See application file for complete search history.

(56) References Cited

U.S. PATENT DOCUMENTS

| | | | |
|---|---|---|---|
| 5,077,666 A | 12/1991 | Brimm et al. | |
| 5,455,953 A | 10/1995 | Russell | |
| 5,530,861 A | 6/1996 | Diamant et al. | |
| 5,581,691 A | 12/1996 | Hsu et al. | |
| 5,664,154 A * | 9/1997 | Purcell et al. | 711/167 |
| 5,678,041 A | 10/1997 | Baker et al. | |
| 5,692,125 A | 11/1997 | Schloss et al. | |
| 5,708,780 A | 1/1998 | Levergood et al. | |
| 5,724,595 A | 3/1998 | Gentner | |
| 5,732,408 A * | 3/1998 | Takahashi | 711/113 |
| 5,764,890 A | 6/1998 | Glasser et al. | |
| 5,848,273 A | 12/1998 | Fontana et al. | |
| 5,944,824 A | 8/1999 | He | |
| 5,991,810 A | 11/1999 | Shapiro et al. | |
| 5,999,911 A | 12/1999 | Berg et al. | |

(Continued)

OTHER PUBLICATIONS

Leon, McAfee's NetTools Promises to Ease Network Desktop Diagnosis, InfoWorld, San Mateo, Jul. 24, 1995, vol. 17, Iss. 30, p. 53.

(Continued)

*Primary Examiner*—Hiep T. Nguyen
(74) *Attorney, Agent, or Firm*—Townsend and Townsend and Crew LLP

(57) ABSTRACT

Technology is disclosed for limiting the number of central data store accesses required when performing a series of steps, such as a workflow. A local data store is coupled between a central data store and a system carrying out a workflow. Alternatively, a Transfer Engine is coupled between the local data store and the central data store to transfer data between the local data store and central data store. The Transfer Engine allows the data formats in the central data store and local data store to be independent of each other. During a workflow step, the system stores attributes related to the workflow in the local data store— updating modified attribute values and creating entries for newly added attributes. The system determines whether any attributes in the central data store need to be updated with attribute information from the local data store. The system only updates the central data store with local data store attribute values for new and modified attributes when necessary—avoiding central data store updates after every workflow step.

55 Claims, 11 Drawing Sheets

U.S. PATENT DOCUMENTS

| | | | |
|---|---|---|---|
| 6,073,109 | A | 6/2000 | Flores et al. |
| 6,098,056 | A | 8/2000 | Rusnak et al. |
| 6,131,120 | A | 10/2000 | Reid |
| 6,134,634 | A * | 10/2000 | Marshall et al. ............ 711/143 |
| 6,138,104 | A | 10/2000 | Marchak et al. |
| 6,141,778 | A | 10/2000 | Kane et al. |
| 6,151,531 | A | 11/2000 | Frankel et al. |
| 6,158,010 | A | 12/2000 | Moriconi et al. |
| 6,182,142 | B1 | 1/2001 | Win et al. |
| 6,208,986 | B1 | 3/2001 | Schneck et al. |
| 6,212,558 | B1 | 4/2001 | Antur et al. |
| 6,253,239 | B1 | 6/2001 | Shklar et al. |
| 6,256,739 | B1 | 7/2001 | Skopp et al. |
| 6,266,420 | B1 | 7/2001 | Langford et al. |
| 6,278,993 | B1 | 8/2001 | Kumar et al. |
| 6,338,097 | B1 | 1/2002 | Krenzke et al. |
| 6,347,312 | B1 | 2/2002 | Byrne et al. |
| 6,349,306 | B1 | 2/2002 | Malik et al. |
| 6,366,913 | B1 | 4/2002 | Fitler, Jr. et al. |
| 6,401,101 | B1 | 6/2002 | Britton et al. |
| 6,434,531 | B1 | 8/2002 | Lancelot et al. |
| 6,442,567 | B1 | 8/2002 | Retallick et al. |
| 6,490,655 | B1 * | 12/2002 | Kershaw .................... 711/133 |
| 6,499,023 | B1 * | 12/2002 | Dong et al. .................. 706/46 |
| 6,539,379 | B1 | 3/2003 | Vora et al. |
| 6,721,804 | B1 | 4/2004 | Rubin et al. |
| 6,732,178 | B1 | 5/2004 | Van Horne et al. |
| 6,785,686 | B1 | 8/2004 | Boreham et al. |
| 2002/0032684 | A1 | 3/2002 | Kobayashi et al. |
| 2002/0038306 | A1 | 3/2002 | Griffin et al. |
| 2003/0028752 | A1 | 2/2003 | Fu et al. |
| 2003/0037052 | A1 | 2/2003 | Kitain et al. |
| 2003/0055806 | A1 | 3/2003 | Wong et al. |
| 2003/0088708 | A1 | 5/2003 | Lewallen |
| 2003/0105733 | A1 | 6/2003 | Boreham et al. |
| 2003/0105742 | A1 | 6/2003 | Boreham et al. |
| 2003/0115196 | A1 | 6/2003 | Boreham et al. |
| 2003/0115548 | A1 | 6/2003 | Melgar |
| 2003/0120593 | A1 | 6/2003 | Bansal et al. |
| 2003/0145074 | A1 | 7/2003 | Penick |
| 2003/0217127 | A1 * | 11/2003 | Sinn ........................... 709/223 |
| 2004/0024762 | A1 | 2/2004 | Agarwal et al. |

OTHER PUBLICATIONS

Cooney, IBM rolls out host- and server-based mgmt. apps, Network World, Framingham, Feb. 6, 1995, vol. 12, Iss. 6, pp. 6-7.
Walsh, Remedy releases three applications for help-desk suite, InfoWorld, San Mateo, Apr. 21, 1997, vol. 19, Iss. 16, p. 34.
Schmersal, Testing to maintain service standards, Communications News, Nokomis, Mar. 1998, vol. 35, Iss. 3, pp. 22-23.
Musthaler, The trouble with help desk selection, Network World, Framingham, Feb. 20, 1995, vol. 12, Iss. 8, pp. 35-39.
Clear Trust, Unified Access Management, Securant Technologies, Inc., pp. 1-23, 1997.
SiteMinder Agent Operations, Verson 4.0, Netegrity Inc., 1997.
SiteMinder Deployment Guide, Version 4.0, Netegrity Inc., 1997.
SiteMinder Policy Server Operations Guide, Version 4.0, Netegrity Inc., 1997.
SiteMinder Developer's API Guide, Version 4.0, Netegrity Inc., 1997.
SiteMinder Installation Guide, Version 4.0, Netegrity Inc., 1997.
U.S. Appl. No. 10/314,888, Office Action dated Jan. 26, 2006, 31 pages.
U.S. Appl. No. 10/327,607, Office Action dated Feb. 13, 2006, 5 pages.
U.S. Appl. No. 10/354,913, Office Action dated Sep. 9, 2003, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
U.S. Appl. No. 10/354,914, Office Action dated Aug. 1, 2005, 15 pages.
U.S. Appl. No. 10/354,914, Final Office Action dated Feb. 10, 2006, 16 pages.

* cited by examiner

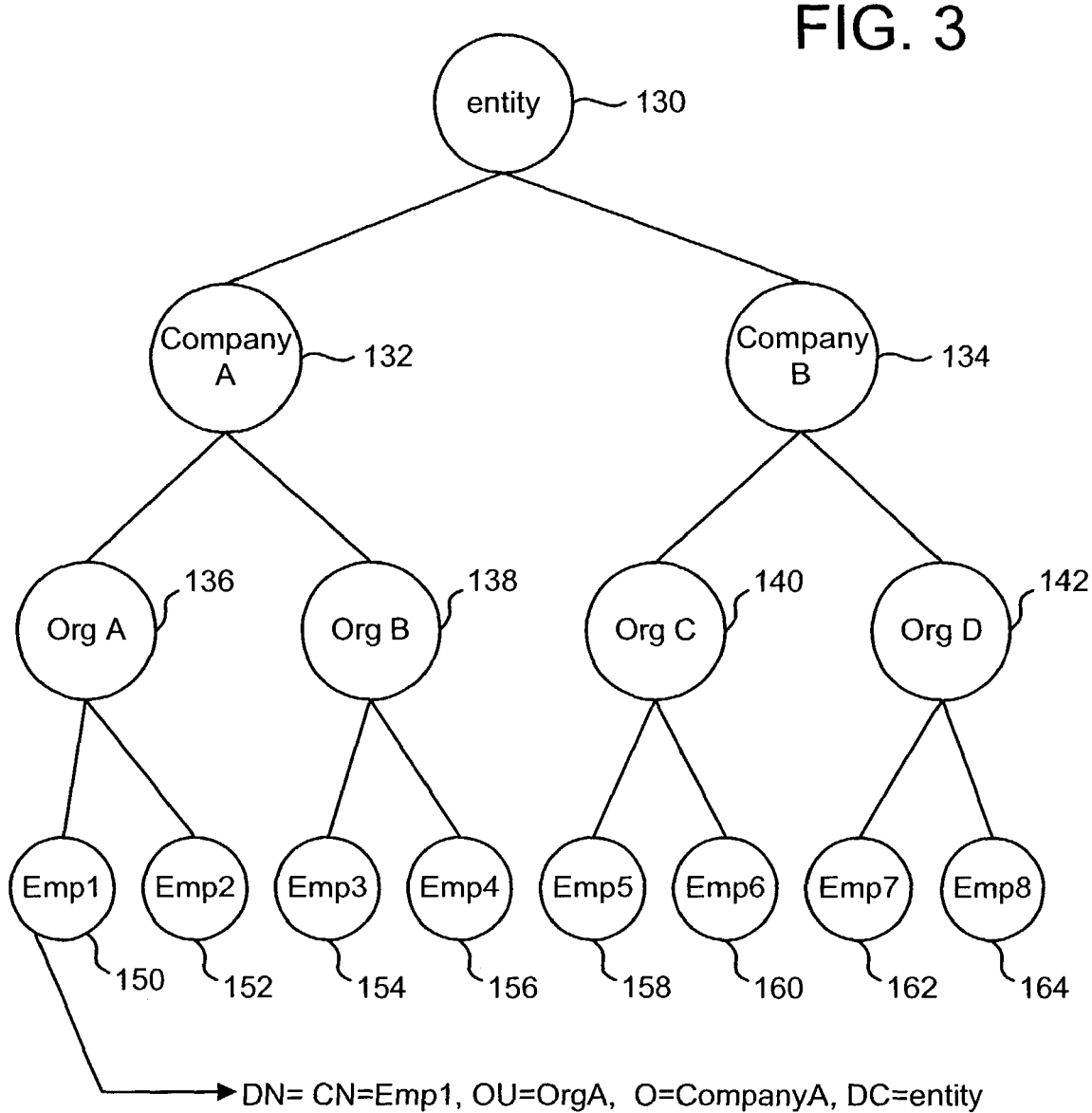
FIG. 3
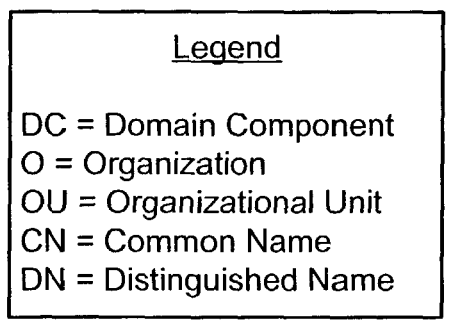

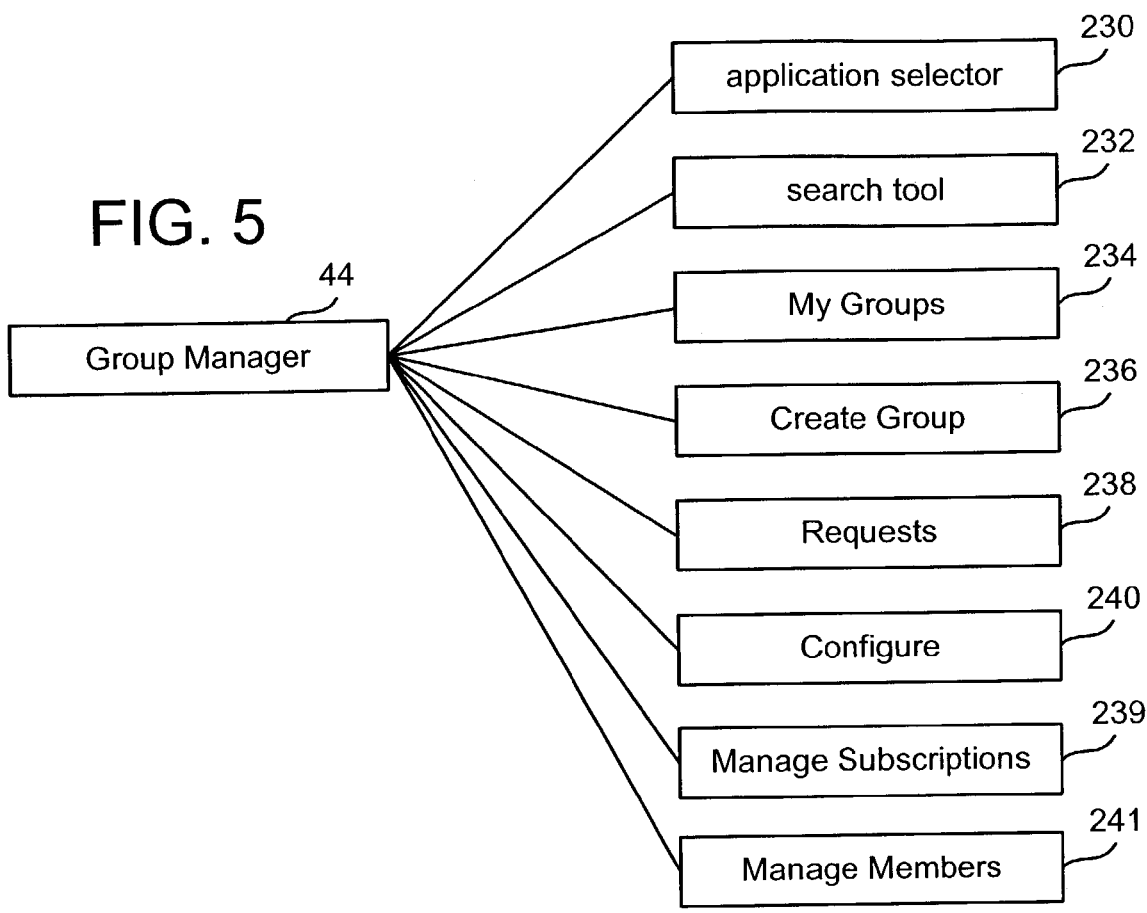
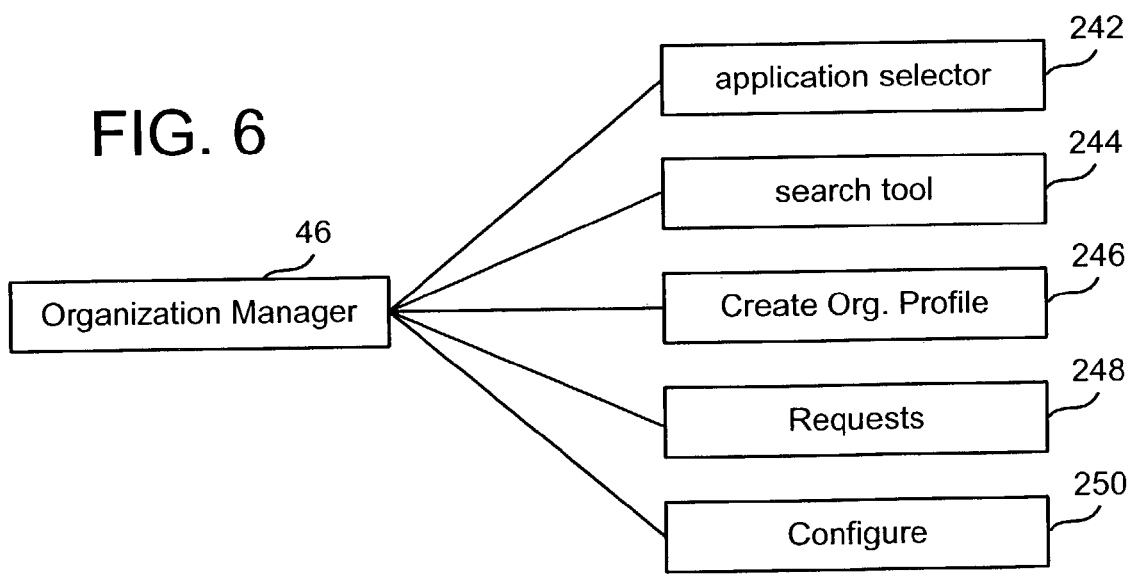

| Workflow 1 | Step 1 | Attribute 1 | Value 1 | Not Modified | 300 |
| | | Attribute 2 | Value 2 | Not Modified | 302 |
| | Step 2 | Attribute 1 | Value 1' | Modified | 304 |
| | | Attribute 2 | Value 2 | Not Modified | 306 |
| | | Attribute 3 | Value 3 | Added | 308 |
| | Step 3 | Attribute 1 | Value 1' | Modified | 310 |
| | | Attribute 2 | Value 2' | Modified | 312 |
| | | Attribute 3 | Value 3' | Added | 314 |

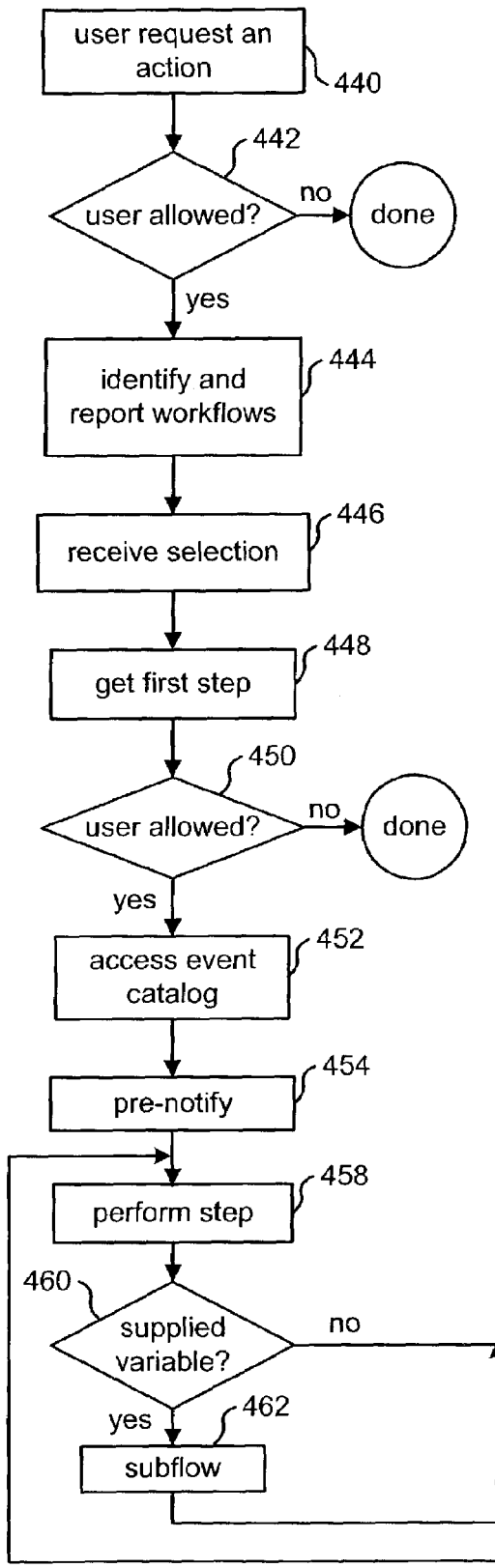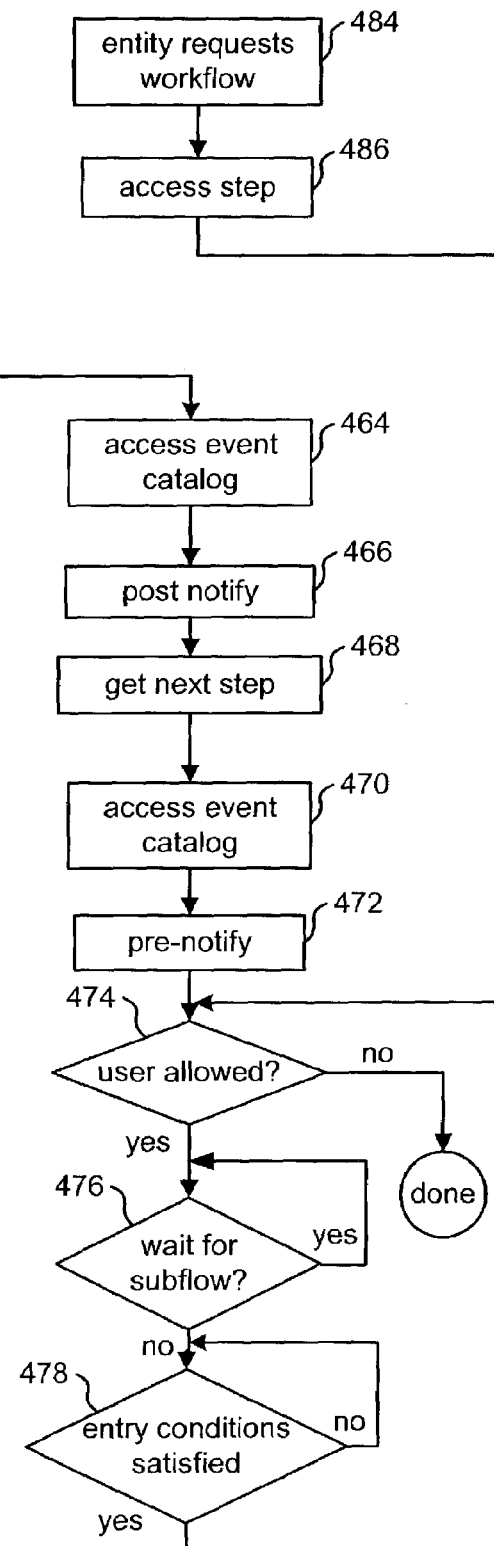
FIG. 15

EMPLOYING LOCAL DATA STORES TO MAINTAIN DATA DURING WORKFLOWS

This application claims the benefit of U.S. Provisional Application No. 60/395,152, "Access and Identity System," filed on Jul. 11, 2002, which is incorporated herein by reference.

CROSS-REFERENCE TO RELATED APPLICATIONS

This Application is related to U.S. patent application Ser. No. 09/999,074, entitled "Workflows With Associated Processes," filed on Nov. 30, 2001, and incorporated herein by reference in its entirety.

BACKGROUND OF THE INVENTION

1. Field of the Invention

The present invention is directed to technology for limiting central data store accesses during a workflow or another series of processing steps.

2. Description of the Related Art

With the growth of the Internet, the use of networks, and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

Identity Systems frequently store most attributes in one or more central data stores, such as a directory or database. As the volume of data maintained in the central data store grows, pressure on the bandwidth of the central data store mounts—data store bandwidth can be a limiting factor in the amount of data and other resources the Identity System can support. Central data store accesses can also be time consuming—taking place remotely over a network connection in some implementations.

Some Identity Systems employ workflows to carry out a variety of operations, such as adding and modifying identity profiles for system users. A workflow breaks an operation into a series of steps that are performed by the Identity Systems and other entities. In some instances, the Identity System calls on another entity to carry out a function called for in a workflow step, such as provisioning resources to a user. The Identity System then waits for the called entity to complete the assigned function.

Identity Systems employing workflows typically update the central data store at the end of each step in a workflow—updating the attributes related to the workflow. This places substantial demands on central data store bandwidth. In many instances, the updates of attributes in the central data store are unnecessary. Only certain circumstances require attributes in the central data store to be up to date. For example, an updated attribute is necessary when another entity needs to use the attribute. These circumstances, however, do not typically occur after every workflow step. It is desirable to reduce the number of central data store updates performed in each workflow.

Some Identity System users also employ an Access Systems. An Access System provides for the authentication and authorization of users attempting to access resources. For efficiency purposes, there is an advantage to integrating the Identity System and the Access System. Additionally, integrating the Identity System and the Access System allows for single-sign-on functionality across multiple resources. Thus, there is also a need to reduce workflow related accesses of a central data store, such as a directory, in an Access Systems and integrated Identity/Access Systems. Systems other than Identity and Access Systems can also benefit from reducing central data store accesses when carrying out workflows.

SUMMARY OF THE INVENTION

The present invention, roughly described, pertains to technology for limiting the number of central data store accesses required when performing a series of processing steps, such as a workflow. In one implementation, an Identity System maintains attribute updates in a local data store during the performance of a workflow. The attribute updates are transferred to the central data store once the workflow is completed or another set of circumstances makes the central data store update necessary. In alternate embodiments, the Identity System is replaced by an Access System, integrated Identity/Access System or another type of system.

In one embodiment, the local data store is coupled between the Identity System and the central data store. In an alternate embodiment, a Transfer Engine in coupled between the local data store and the central data store. The Transfer Engine transfers data between the local data store and central data store—allowing the data formats in the central data store and local data store to be independent of each other.

During a workflow in one embodiment, the Identity System stores attributes related to the workflow in the local data store. At the end of each workflow step, the Identity System updates attribute entries in the local data store—updating any modified attribute values and creating entries for any newly added attributes. The Identity System determines whether any attributes in the central data store need to be updated with attribute information from the local data store. For example, the central data store needs to be updated at the completion of failure of a workflow in one implementation. If a central data store update is necessary, the update is performed. In one embodiment, the Identity System only updates the central data store with local data store values for new and modified attributes—avoiding wasteful data transfers for attributes that have not been altered.

Various embodiments of the present invention are incorporated in an Identity, Access, or integrated Identity/Access System. This enables the applications in these systems to reduce central data store accesses, such as directory accesses. Further embodiments, however, are employed in systems other than Identity, Access, and integrated Identity/Access Systems.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 3 is an example of a directory tree structure.

FIG. 5 is a block diagram depicting the Group Manager.

FIG. 6 is a block diagram depicting the Organization Manager.

FIG. 12 is a flowchart describing one embodiment of a process for updating a local data store.

FIG. 15 is a flow chart describing one embodiment of a process for using a workflow.

DETAILED DESCRIPTION

Figure 1:
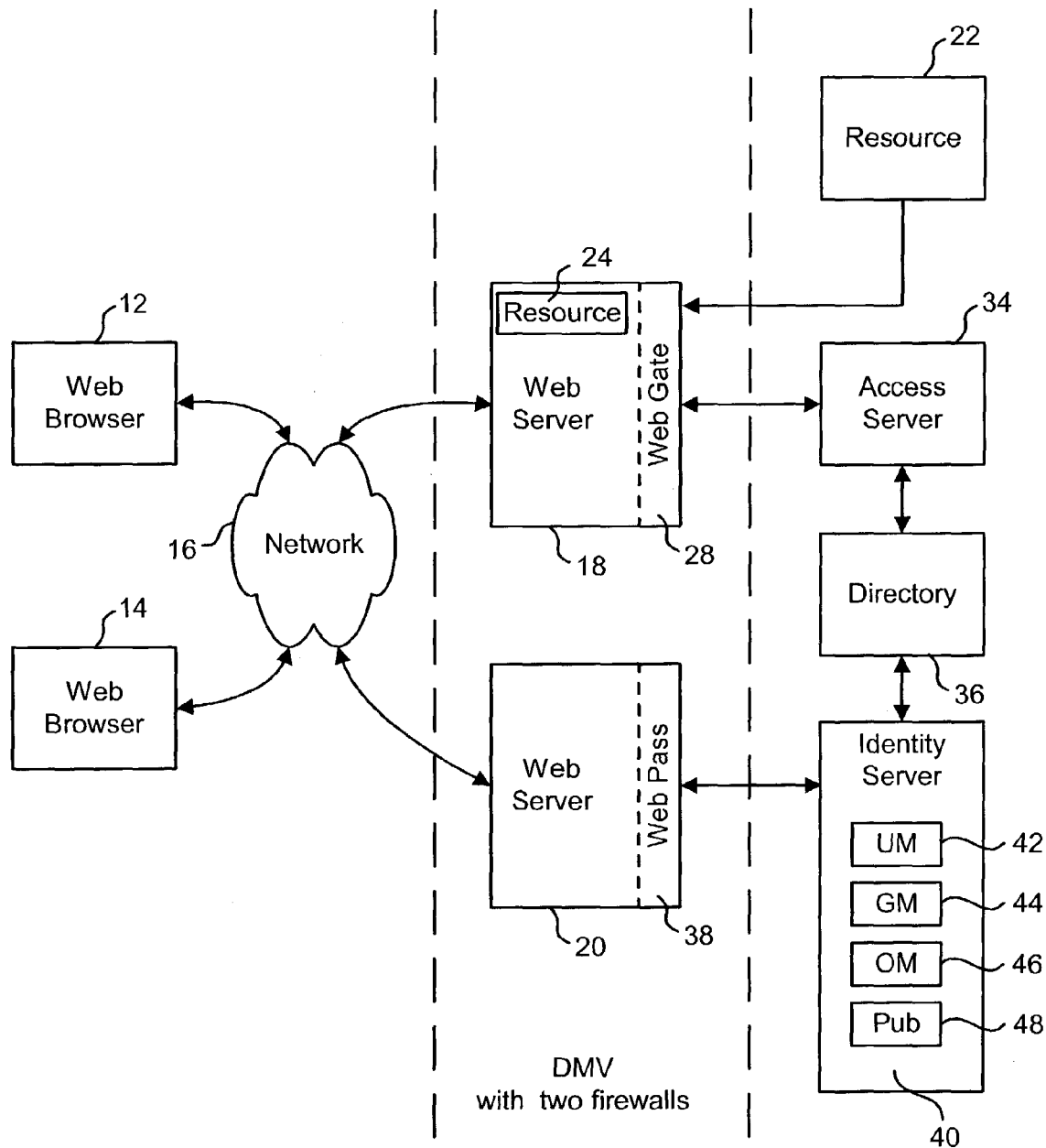
FIG. 1 is a block diagram depicting the components of one embodiment of the present invention.

FIG. 1 depicts an example of an access management system that provides identity management services and/or access management services for a network. The identity management portion of the system (referred to as "the Identity System") manages identity profiles, while the access management portion of the system (referred to as "the Access System") provides security for resources across one or more Web Servers (or other components). A key feature of one embodiment of this system is the centralization of the repositories for policies and identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be many Web Servers, many Access Servers, and many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources. With a typical unprotected resource, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information.

The received log-on information is passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts.

After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
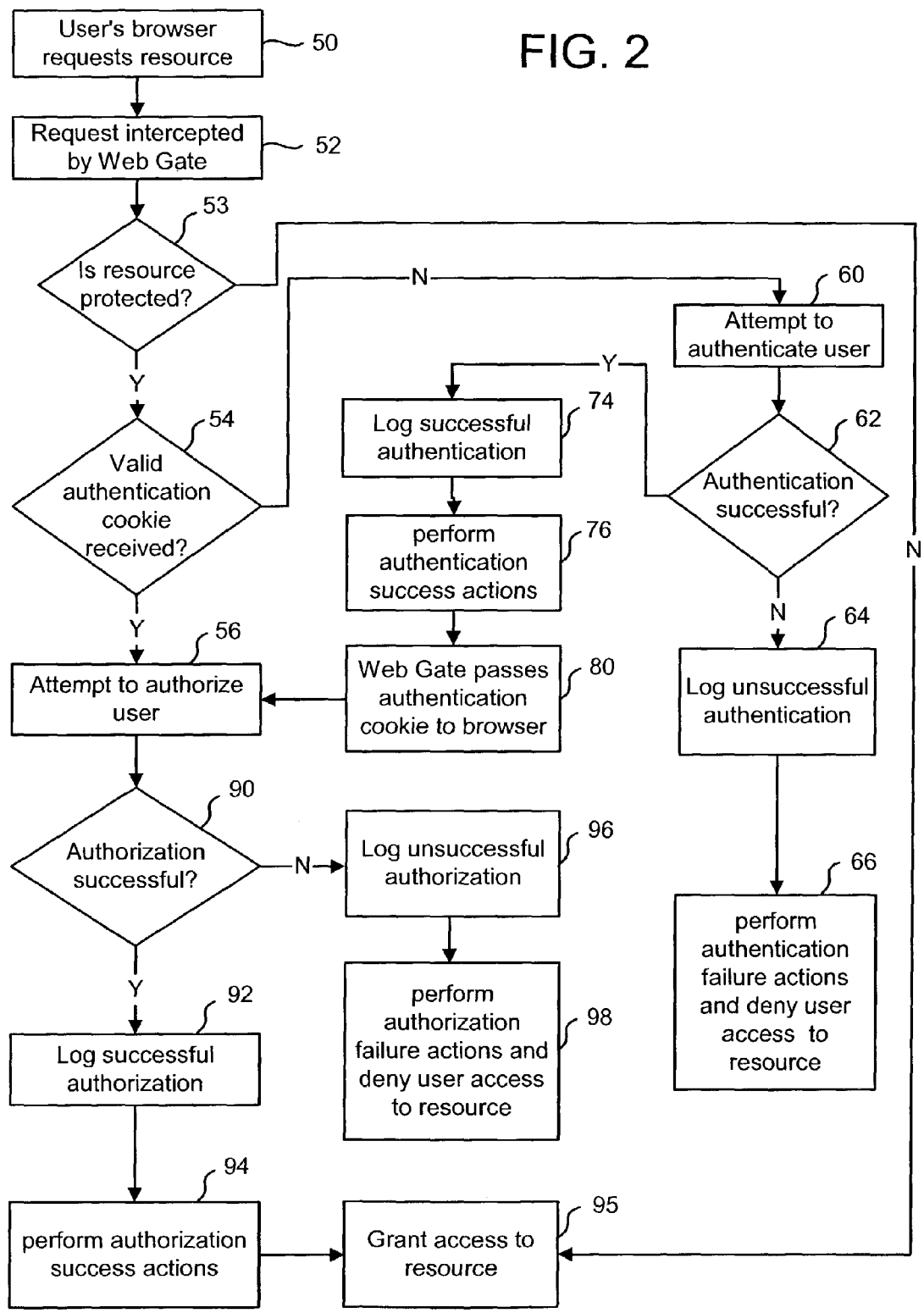
FIG. 2 is a flow chart describing one embodiment of a process for authenticating and authorizing.

FIG. 2 provides a flow chart for one embodiment of a method for authenticating and authorizing. A user's browser 12 requests a web-enabled resource 22 or 24 (step 50). The request is intercepted by Web Gate 28 (step 52). The method then determines whether the requested resource is protected by an authentication and/or authorization rule (step 53). If the resource is not protected, then access is granted to the requested resource (step 95). If the requested resource is protected, however, the method proceeds to step 54. If the user was previously authenticated for a protected resource in the same domain, a valid authentication cookie is passed by browser 12 with the request in step 50. The authentication cookie is intercepted by Web Gate 28 in step 52. If a valid cookie is received (step 54), the method attempts to authorize the user (step 56). If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged (step 64). After step 64, the system performs authentication failure actions and Web Gate 28 denies the user access to the requested resource (step 66). In step 74, the successful authentication of the user for the resource is logged. The method then performs authentication success actions (step 76). In response to the successful authentication, Web Gate 28 then passes a valid authentication cookie to browser 12 (step 80), which stores the cookie. After passing the cookie in step 80, the system attempts to authorize (step 56).

In step 56, the method determines whether the user is authorized to access the requested resource. If the user is authorized (step 90), the method proceeds to step 92. Otherwise, the unsuccessful authorization is logged (step 96). After step 96, the method performs authorization failure actions (step 98) and Web Gate 28 denies the user access to the requested resource. If authorization is successful (step 90), then the successful authorization of the user is logged (step 92). Authorization success actions are performed in step 94. The user is granted access to the requested resource (step 95). In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/999,074, "Workflows With Associated Processes," filed on Nov. 30, 2001, which is incorporated herein by reference in its entirety.

Both the Identity System and the Access System make use of Directory 36. The basic unit of information store in Directory 36 is called an entry or identity profile, which is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait of the object. Each attribute has a type, one or more values, and associated access criteria. The type describes the kind of information contained in the attribute, and the value contains the actual data.

An entry in the directory has a set of attributes that are required and a set of attributes that are allowed. For example, an entry describing a person is required to have a cn (common name) attribute and an sn (surname) attribute. One example of an allowed attribute may be a nickname. Any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

FIG. 3 depicts an exemplar directory tree that can be stored in Directory 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 130. Each of the companies with Extranet access would have a node at a level below node 130. For example, company A (node 132) and company B (node 134) are directly below node 130. Each company may be broken up into organizations. The organizations could be departments in the company or logical groups to help manage the users. For example, FIG. 3 shows company A broken up into two organizations: organization A with node 136 and organization B with node 138. Company B is shown to be broken up into two organizations: organization C with node 140 and organization D with node 142. FIG. 3 shows organization A having two end users:

employee 1 with node 150 and employee 2 with node 152. Organization B is shown with two end users: employee 3 with node 154 and employee 4 with node 156. Organization C is shown with two end users: employee 5 with node 158 and employee 6 with node 160. Organization D is shown with two end users: employee 7 with node 162 and employee 8 with node 164.

Each entity has a distinguished name (DN), which uniquely identifies the node. In one embodiment, each entry also has a relative name, which is different from all other relative names on the same level of the hierarchy. In one implementation, the distinguished name (DN) comprises a union of the relative names up the tree. For example, the distinguished name of employee 1 (node 150) is DN=CN=Empl, OU=OrgA, O=CompanyA, DC=entity, where:

DC = Domain Component
O = Organization
OU = Organizational Unit
CN = common name.

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations. Each of these components will now be described in more detail.

Figure 4:
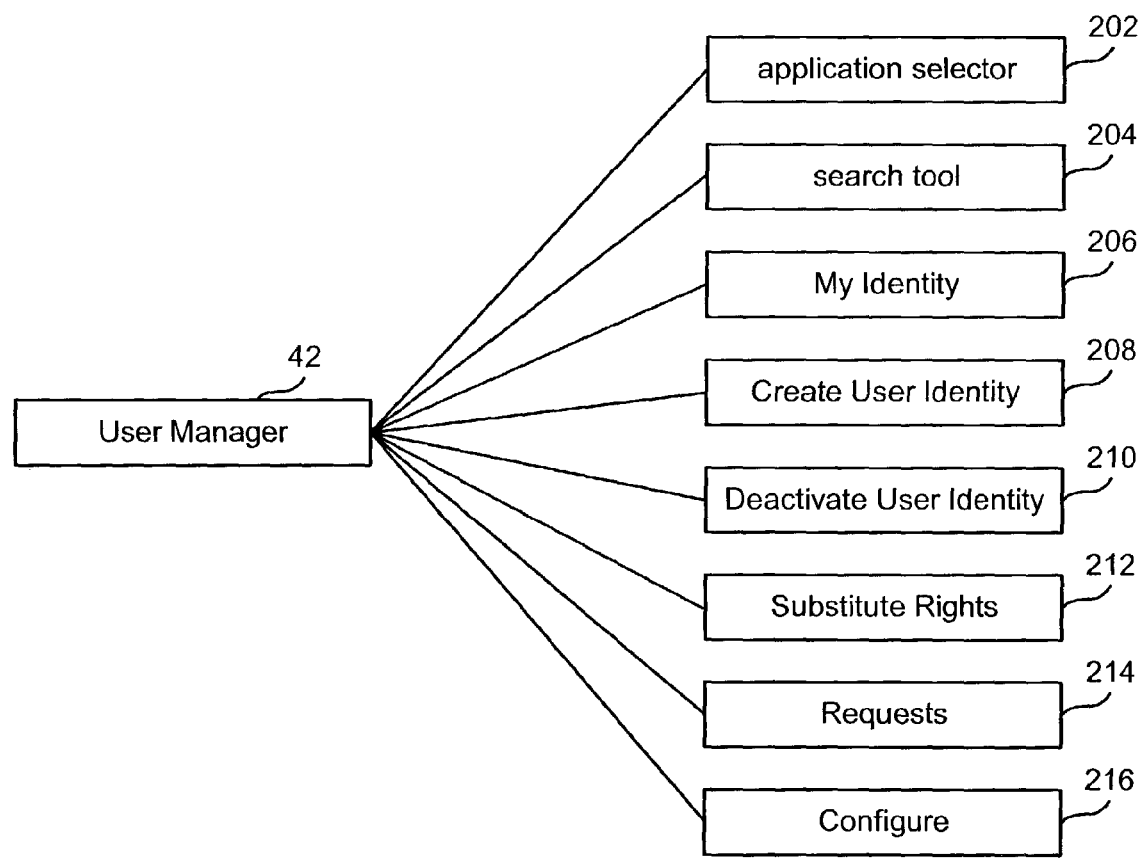
FIG. 4 is a block diagram depicting the User Manager.

FIG. 4 graphically depicts the various services provided by User Manager 42. Each of these services can be accessed from a User Manager home page. For example, in one embodiment, the home page will include application selector 202, search tool 204, My Identity tab 206, Create User Identity tab 208, Deactivate User Identity tab 210, Substitute Rights tab 212, Requests tab 214 and Configure tab 216. Application selector 202 lets the user change applications from the User Manager to either the Group Manager, Object Manager or Publisher. In one embodiment, application selector 202 is a drop down menu. Search tool 204 enables a user to provide search information in order to search the directory for a set of one or more user identity profiles.

By selecting My Identity tab 206, a user is provided with the information stored in that user's identity profile. Create User Identity tab 208 allows a user with the appropriate privileges to create a new user identity profile (e.g. with a workflow). Deactivate User Identity tab 210 allows a user with proper privileges to remove an identity profile from the directory. Substitute Rights tab 212 allows the user to indicate who can proxy that user and allows the user to be a proxy for someone else. Request tab 214 allows a user to monitor workflows that are in progress or recently completed. Depending on the user's privileges, by selecting request tab 214, the user can see all workflows that, involve that user, that are started by that user, that affect that user or that the user has privileges to view. Request tab 214 will indicate workflows for which there is an outstanding action to be done by the current user. The user can select that workflow and perform the task.

Configure tab 216 allows a user to configure various options for User Manger 42. The user must have sufficient privileges to access Configure tab 216. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 5 depicts the various services provided by Group Manager 44. Once an entity is at the Group Manager home page, the entity can access application selector 230, search tool 232, My Groups tab 234, Create Groups tab 236, Request tab 238, Manage Subscriptions tab 239, Configure tab 240, and Manage Members tab 241. My Groups tab 234 indicates the groups of which the entity is a member. By selecting any of the groups identified by My Groups tab 234 or Search Tool 232, the user will be provided with the identity profile page for that particular group. From the profile page, the group can be modified or deleted. Create groups tab 236 allows the user to create a new group. Request tab 238 provides the user with access to currently pending and recently finished workflows that involve groups. Configure tab 240 allows the user to configure various information about groups in the Group Manager. While viewing the identity profile for a group, the entity can modify that profile if the entity has appropriate privileges.

Configure tab 240 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities. Manage Subscriptions tab 239 allows users to subscribe to groups or unsubscribe from groups. Manage Members tab 241 allows users to view, add, remove, and search members of a group.

FIG. 6 depicts the services provided by Organization Manager 46. Organization manager 46 provides functionality to create, modify, delete and manage organizational objects. From the home page for Organization Manager 46, a user is provided with application selector 242, search tool 244, Create Organizational Profile tab 246, Request tab 248 and Configure tab 250. Application selector 242 allows the user to select a different application to access. Search tool 244 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 246 allows a user to create new organizational objects, if the user has sufficient privileges. Request tab 248 allows a user to access pending workflows and workflows that have recently been finished that relate to organizational objects. Access to Request tab 248 can be restricted and/or limited depending upon users privileges. If a user has a step to perform for a workflow, it will be indicated by Request tab 248.

Configure tab 250 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

As discussed above, Identity Systems, Access Systems, and integrated Identity/Access Systems employ workflows to carry out desired operations, such as creating or modifying a user identity profile. In general, a workflow is a sequence of steps carried out to perform a desired operation.

More detailed information relating to workflows can be found in U.S. patent application Ser. No. 09/999,074, entitled "Workflows With Associated Processes," which is incorporated herein by reference.

Embodiments of the present invention employ a local data store to reduce the number of accesses to Directory 36 during workflows—freeing bandwidth in Directory 36 and reducing processing time spent transferring data to and from Directory 36. Without the use of a local data store, an entity performing a workflow, such as Identity Server 40, updates profile attributes in Directory 36 after each workflow step. This can result in one or more store operations to Directory 36 after each workflow step. These directory accesses can be very time-consuming, especially when multiple threads of operation carry out multiple workflows at the same time.

A local data store coupled to an entity performing a workflow allows the entity to perform attribute updates locally—reducing the need for accesses to Directory 36. When a workflow step is completed, the state of the attributes involved in the workflow are updated in the local data store. Once the workflow is completed or another circumstance dictates that updated attribute values are needed in Directory 36, then the values in the local data store are uploaded to Directory 36. This reduces the number of unnecessary accesses of Directory 36.

Figure 7A:
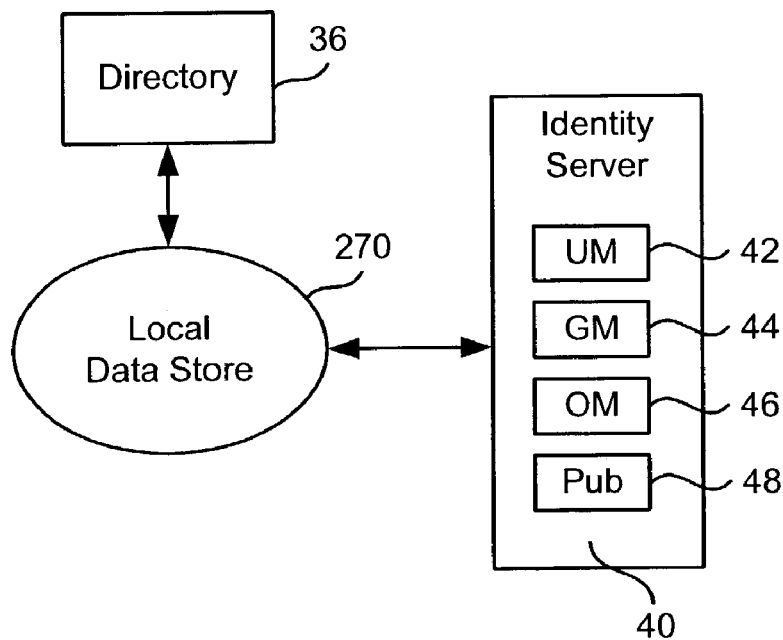
FIGS. 7A and 7B are block diagrams depicting two embodiments of systems that employ a local data store to maintain attribute data during a workflow.

FIG. 7A illustrates a block diagram of one embodiment of a system employing a local data store to maintain attribute data during the performance of a workflow. Identity Server 40 operates as described above with respect to FIG. 1. Local data store 270 is coupled between Directory 36 and Identity Server 40. Identity Server 40 uses local data store 270 to maintain attribute values from profiles the Identity Server 40 employs while executing workflow process. When Identity Server 40 needs to use attributes during a workflow, Identity Server 40 can retrieve them from local data store 270 if they are available. In one embodiment, local data store 270 is a random access memory that is coupled to Identity Server 40 by a local bus—eliminating the need for a network access to communicate with local data store 270. In one implementation, local data store 270 operates as a cache memory. Those skilled in the art will recognize that a variety of data storage mediums can be used to implement local data store 270.

In another implementation, local data store 270 can be coupled to Identity Server 40 through a network connection. In one example, local data store 270 is only coupled to Identity Server 40 and Directory 36. In alternate embodiments, local data store 270 is coupled to multiple entities for maintaining attribute values, in lieu of always writing the values to Directory 36. For instance, local data store 270 is coupled to Access Server 34 in one embodiment. Local data store 270 can be accessed by any of the applications running on the entities coupled to local data store 270. In the system shown in FIG. 7A, local data store 270 can be accessed by User Manager 42, Group Manager 44, and Organization Manager 46. Although FIG. 7A and other figures are described with reference to Identify Server 40 performing operations related to local data store 270, those skilled in that art will recognize that any other entity or application in communication with local data store 270 can perform the same operations.

When Identity Server 40 performs a workflow, local data store 270 obtains attribute values for one or more profiles in Directory 36 related to the workflow. During the workflow, the values in data store 270 are utilized by Identity Server 40 and updated. At the completion of the workflow, or the occurrence of another triggering event, attribute values maintained in local data store 270 are loaded into Directory 36—bringing the entries in Directory 36 to the most current state.

Figure 7B:
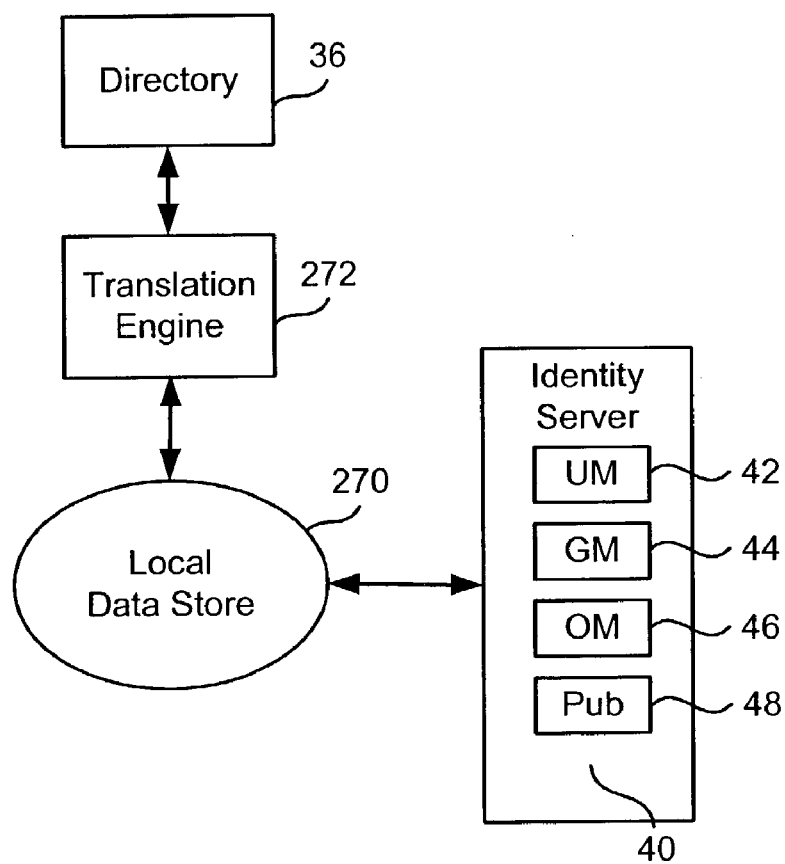

FIG. 7B shows an alternate embodiment of a system including local data store 270. Translation Engine 272 couples Directory 36 to local data store 270. Translation Engine 272 translates between the data formats employed by local data store 270 and Directory 36. Translation Engine 272 allows the data format in local data store 270 to be independent of the data format employed in Directory 36. Many other variations of local data store 270 can be employed in various embodiments of the present invention. For example, local data store 270 may be partitioned into separate local data stores that each individually communicate only with a single application in Identity Server 40, such as User Manager 42, Group Manager 44, and Organization Manager 46. Further embodiments include multiple local data stores, with each local data store communicating with a separate Identity Server or Access Server.

Figure 8A:
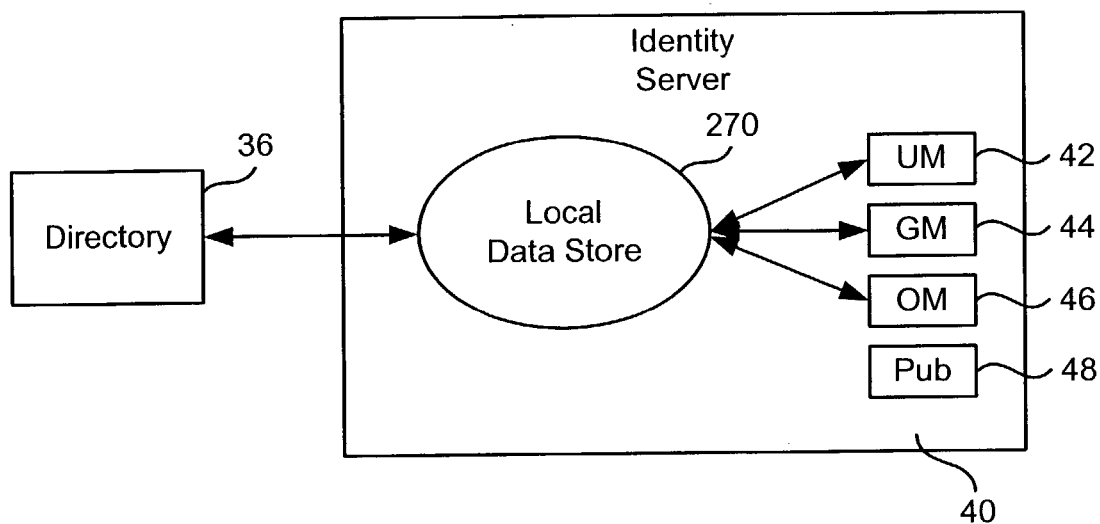
FIGS. 8A and 8B are block diagrams depicting two more embodiments of systems that employ a local data store to maintain attribute data during a workflow.
Figure 8B:
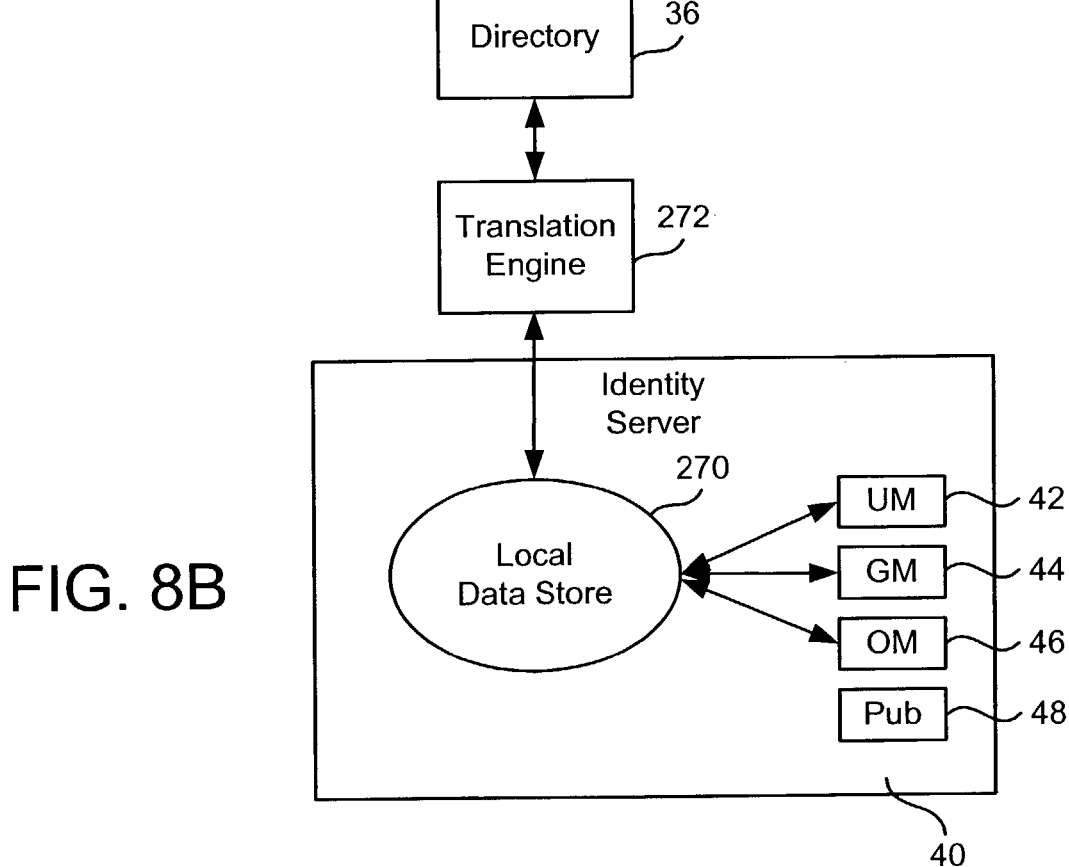

FIG. 8A shows yet another implementation of local data store 270. Local data store 270 is incorporated into Identity Server 40 and coupled to User Manager 42, Group Manager 44, and Organization Manager 46. Local data store 270 is also coupled to Directory 36. FIG. 8B shows an implementation with Identity Server 40, including local data store 270 and Translation Engine 272 coupling Directory 36 to local data store 270, as described above for FIG. 7B. Those skilled in the art will recognize that various alternate implementations of local data store 270 are possible and fall within the scope of the present invention.

Figures 9, 10:
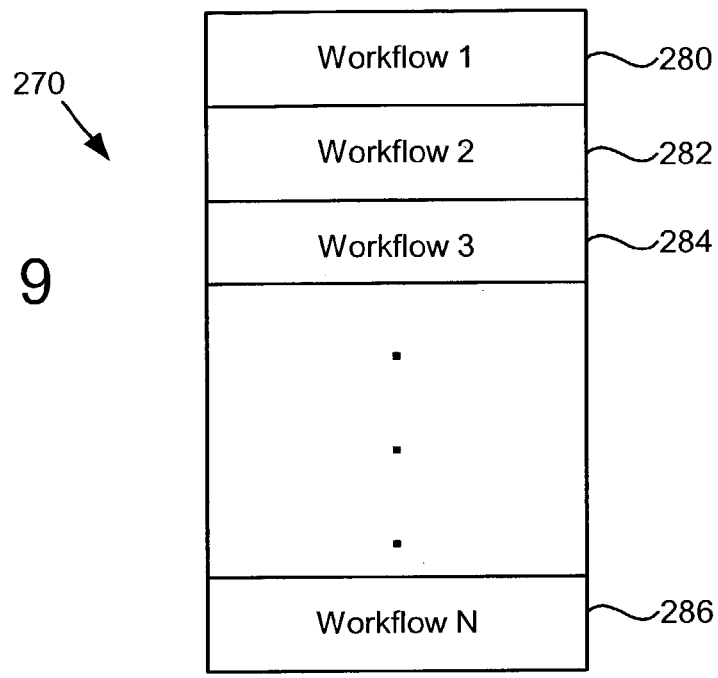
FIG. 9 is a block diagram depicting one embodiment of a local data store for maintaining attribute data during a workflow.
FIG. 10 is a block diagram depicting one embodiment of a set of local data store entries associated with a workflow.

FIG. 9 is a block diagram depicting one embodiment of local data store 270 for maintaining attribute values related to one or more workflows. Local data store 270 contains multiple segments, with each segment corresponding to a workflow. Each segment in local data store 270 has a unique identifier that allows Identity Server 40, or another processing entity, to access the segment. In one example, segment 280 corresponds to Workflow 1. Segment 282 corresponds to Workflow 2. Segment 284 corresponds to Workflow 3, and segment 286 corresponds to Workflow N. Each segment maintains attribute information for identity profiles related to a process carried out in a workflow. In alternate embodiments, each segment can support data for processes other than workflows. For example, segments in local data store 270 correspond to subflows in one embodiment. In another implementation, segments in local data store 270 correspond to processing that takes place outside of the Identity System or Access System, such as pre and post processing performed by third party applications. In a further embodiment, local data store 270 supports a mixture of workflows, subflows and third-party applications.

FIG. 10 illustrates one embodiment of a segment in local data store 270, such as segment 280 for Workflow 1. Segment 280 includes unique identifier 316, which corresponds to Workflow 1. Segment 20 includes attribute entries 300, 302, 304, 306, 308, 310, 312, and 314. Each entry corresponds to an attribute associated with Workflow 1. The entries in segment 280 include the following fields: 1) Step Field 318—identifying a step in Workflow 1; 2) Attribute Name Field 320—identifying the name of an attribute from an identity profile employed by Workflow 1; 3) Attribute Value Field 322—identifying the value of the attribute listed in field 320; and 4) State Field 324—identifying the state of the attribute listed in field 320.

In one embodiment, State Field 324 supports three possible values: 1) Added; 2) Modified; and 3) Not Modified. The Modified state indicates that the attribute identified in the entry has been modified, since the attribute was loaded into Segment 280 from Directory 36. The Not Modified state indicates that the value for the entry's attribute has not changed since being downloaded into local data store 270 from Directory 36. An Added state indicates that the attribute identified in the entry has been added as a new attribute in the profile, since other attributes in the profile for the attribute were loaded into segment 280. In alternate embodiments, additional states are supported, such as Deleted—indicating that an attribute has been deleted from the profile.

The example shown in FIG. 10 only represents the resulting local data store segment for a workflow that operates using a single identity profile from Directory 36. One example of such an identity profile is a user identity profile, as described above with reference to FIG. 3. In alternate embodiments, segment 280 supports entries for workflows that operate using multiple profiles. In one such embodiment, Attribute Name Field 320 identifies the attribute name and corresponding identity profile for the attribute. In a further embodiment, segment 280 includes an extra field to identify the identity profile.

Entries 300 and 302 each correspond to attributes in an identity profile employed by Workflow 1 in the first step of Workflow 1. Entry 300 identifies Attribute 1 in an identity profile. Attribute 1 has Value 1 and a state of Not Modified at the end of a step 1. Entry 302 shows Attribute 2 having a Value 2 and a state of Not Modified at the end of step 1. Entries 300 and 302 are added to segment 280 at the completion of step 1 in Workflow 1. As shown in FIG. 10, step 2 of Workflow 1 results in the addition of a new attribute identified as Attribute 3, and the modification of the value for Attribute 1. Entry 304 indicates that Attribute 1 has a new value of Value 1 and a state of Modified—indicating that the value of Attribute 1 has been modified since information for Attribute 1 was first loaded into segment 280. Entry 306 shows that Attribute 2 remains unchanged as a result of step 2. Entry 308 shows that Attribute 3, having a value of Value 3, was added to the identity profile in step 2 of Workflow 1.

In step 3 of Workflow 1, Attributes 2 and 3 are modified. Entry 310 shows that Attribute 1 maintained a value of Value 1' during step 3. The state for Attribute 1 remains Modified to reflect the prior change. Entry 312 shows that Attribute 2 changed to have a value of Value 2'—resulting in a state of Modified. Entry 314 shows that Attribute 3 was modified in step 3 to have a value of Value 3'. The state for Attribute 3 remains at Added to reflect the prior addition of Attribute 3. In alternate embodiments, Attribute 3 may have a state of Added and Modified.

Figure 11:
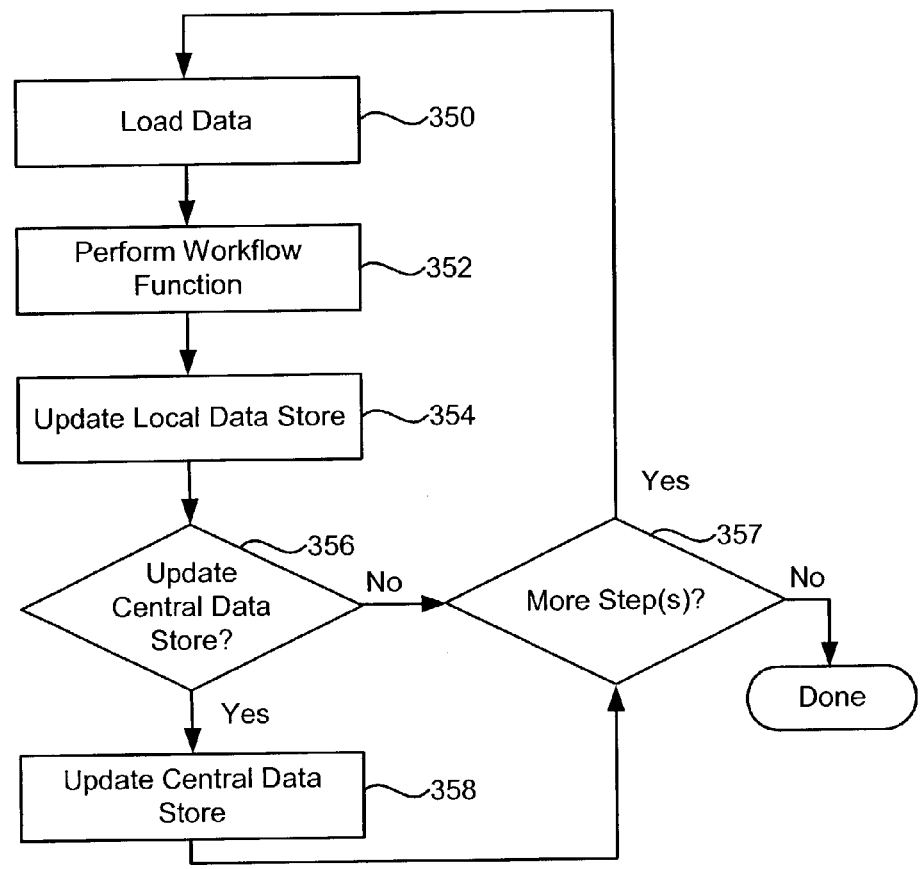
FIG. 11 is a flowchart describing one embodiment of a process for employing a local data store during a workflow step.

FIG. 11 is a flowchart describing one embodiment of a process for employing local data store 270 during a step in a workflow. In one implementation, attribute data from Directory 36 is loaded into local data store 270 (step 350). This step results in local data store 270 receiving values for attributes that are employed by the workflow. The attributes are loaded into attribute entries in a segment in local data store 270 that correspond to the current workflow step. The attribute entries are loaded in the format described above with reference to FIG. 10 in one implementation.

In one embodiment, the application carrying out the workflow runs on Identity Server 40, which causes step 350 to be performed. In alternate embodiments, different processing entities within the Identity System, Access System, or integrated Identity/Access System carry out the workflow and cause step 350 to be performed. Step 350 may not be performed for every workflow step. In some workflow steps, only the data from local data store 270 is employed, in lieu of retrieving data from Directory 36. This provides a system performance enhancement. Using the attribute values in local data store 270 reduces the number of directory accesses—saving valuable directory bandwidth and reducing the time needed to carry out a workflow. Typically, data is downloaded from Directory 36 to local data store 270 when a new profile is being employed for the first time in a workflow.

For purposes of convenience, Identity Server 40 will be referred to as carrying out the steps described with respect to FIGS. 11 through 14. Those skilled in the art, however, will recognize that embodiments of the current invention are not limited to Identity Server 40 carrying out these steps. In further embodiments, different processing entities such as Access Server 34, components of the Identity System, components of the Access System, or any applications within or outside either of these systems, can be responsible for carrying out the operations described with respect to FIGS. 11 through 14. Those skilled in the art will also recognize that central data stores other than Directory 36 can be employed with embodiments of the present invention. For example, Directory 36 can be replaced as the central data store by a relational database.

Returning to FIG. 11, Identity Server 40 performs a function specified for a workflow step (step 352). For example, a workflow step may call for obtaining data, obtaining approval, or performing a processing operation on data. Many different workflow functions can be implemented. At the end of the workflow step, Identity Server 40 updates local data store 272 (step 354). As shown in FIG. 10, Identity Server 40 creates attribute entries associated with the workflow step performed—identifying all known attributes, attribute values and the current states for each attribute. In an alternate embodiment, local data store updates are performed prior to the end of a workflow step. Identity Server 40 determines whether to update the central data store, such as Directory 36 (step 356). If no update is necessary, the workflow step is complete. If there are more steps in the workflow, the above-described process is repeated for a remaining step (step 357). Otherwise, the workflow is done. If updating the central data store is necessary (step 356), Identity Server 40 performs a central data store update. Identity Server 40 causes attribute values from local data store 270 for the latest workflow step to be loaded into a corresponding identity profile in the central data store, such as Directory 36 (step 358).

In various embodiments of the present invention, different criteria can be set for determining when it is appropriate to update Directory 36 (step 356). In one embodiment, an upload to Directory 36 is performed under any of the following circumstances: 1) the workflow is completed; 2) a subflow is initiated; 3) the workflow step calls for user interaction; 4) the workflow instructs another entity to perform an operation and the workflow must wait for a response from the other entity; or 5) the workflow failed. Those skilled in the art will recognize that many different circumstances can be used to determine whether data from local data store 270 should be updated into Directory 36. The circumstances listed above ensure that attribute changes made by the workflow are reflected in Directory 36 when other entities have a possibility of accessing the changed attributes in Directory 36.

FIG. 11 has been described as having Identity Server 40 facilitate the exchange of data between Directory 36 and local data store 370 (steps 350 and 358). In one embodiment, Translation Engine 272 (FIGS. 7B and 8B) carries out these exchanges. In alternate embodiments, Translation Engine 272 works with other entities, such as Identity Server 40, to carry out the exchanges (steps 350 and 358).

FIG. 12 is a flow chart describing one embodiment of a process for updating local data store 272 (step 354, FIG. 11). Identity Server 40 selects an attribute that needs an attribute entry in segment 280 to be updated (step 370). In different embodiments, various standards are applied to determine the attributes that require updates. In one example, all attributes that are added in the current workflow step or already exist in segment 280 constitute all attributes requiring an attribute entry update. In another example, updating is only required for Added and Modified attributes. In other implementations, different criteria can be applied.

Identity Server 40 determines whether it is necessary to rollback the attribute in the selected entry (step 372). In one embodiment, a rollback requires giving the attribute its original value prior to any workflow steps being performed. Alternatively, a rollback may only require the attribute to go back to a value from a prior workflow step. A rollback may be desired when a component in the Identity or Access System has failed. If a rollback is necessary, Identity Server 40 arranges for the Attribute Value in the selected attribute entry to be loaded with the value corresponding to the attribute's value at the rollback point. If local data store 272 has the attribute value called for by the rollback, Identity Server 40 obtains this value. Otherwise, Identity Server 40 obtains the rollback attribute value from Directory 36.

If a rollback is not desired (step 372), Identity Server 40 updates the selected attribute entry in local data store 270 (step 376)—updating the Attribute Name, Attribute Value, and State fields for the current workflow step with the most current values. After updating the selected entry, Identity Server 40 determines whether any attributes requiring an attribute entry update for the current workflow step have not yet been selected (step 378). If these attributes have been selected, the process is done. Otherwise, a new attribute entry is selected (step 370) and the process in FIG. 12 is repeated.

Figure 13:
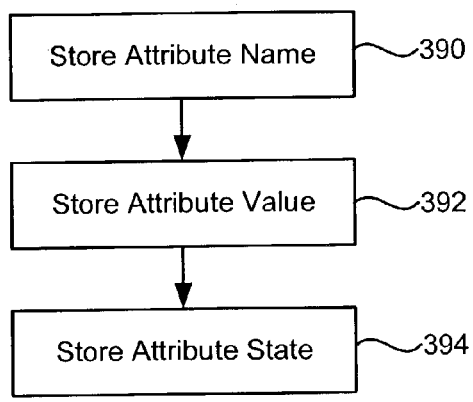
FIG. 13 is a flowchart describing one embodiment of a process for storing a local data store attribute entry.

FIG. 13 shows one embodiment of a process for updating an entry in local data store 270 (step 376, FIG. 12). Identity server stores an attribute name in Attribute Name Field 320 for the current workflow step (step 390). Identity Server 40 stores a value for the attribute in Attribute Value Field 322 for the current workflow step (step 392). Identity Server 40 stores a state in State Field 324 (step 394). As described above, the possible attribute states include Modified, Not Modified, and Added in one embodiment.

Figure 14:
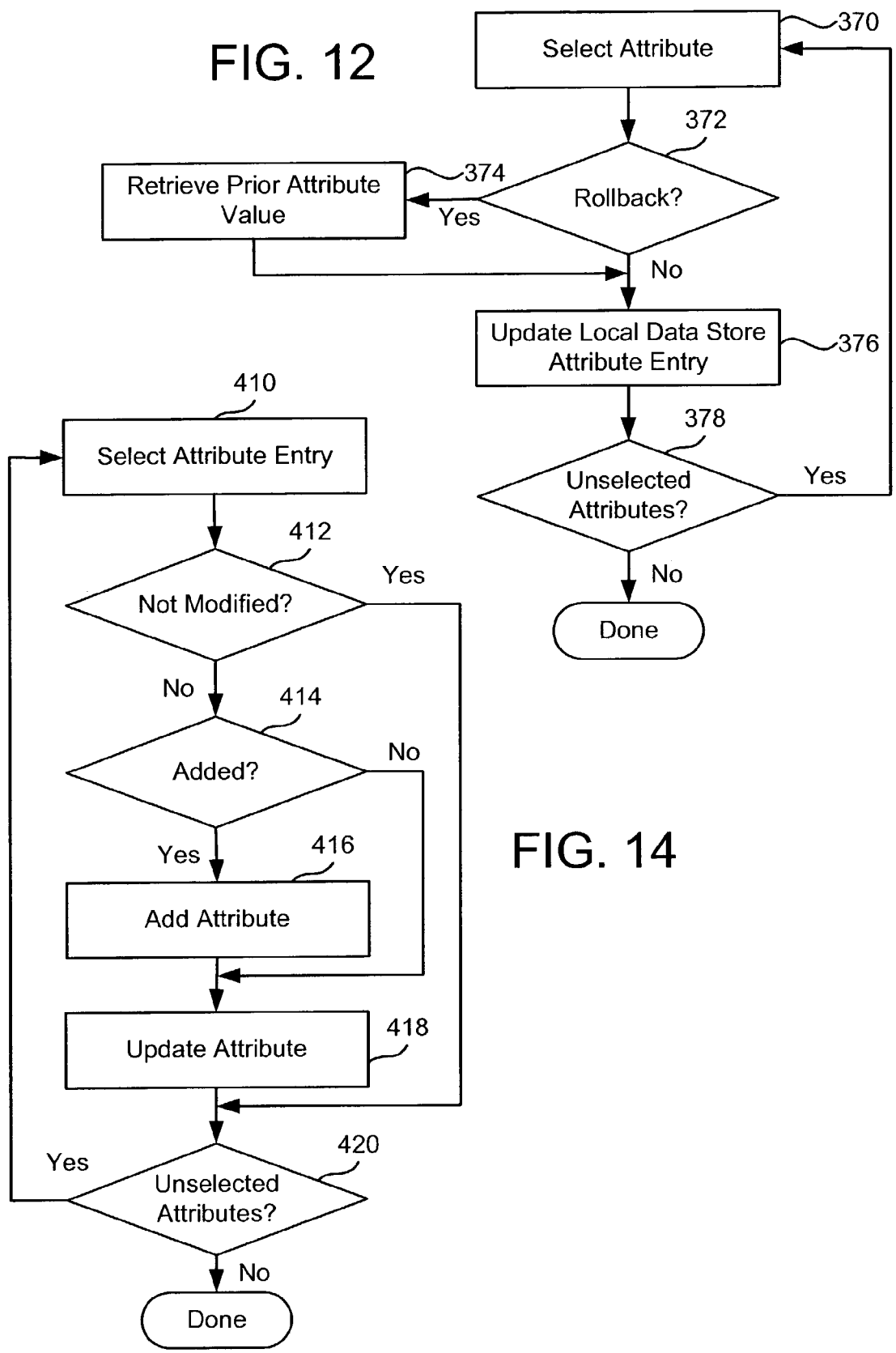
FIG. 14 is a flowchart describing one embodiment of a process for updating a central data store with data from a local data store that maintains attribute data from a workflow.

FIG. 14 is a flowchart illustrating one embodiment of a process for updating data in a central data store, such as Directory 36 (step 358, FIG. 11). FIG. 14 will be described with the steps being performed by Translation Engine 272. In alternate embodiments, different processing entities may carry out these steps, such as Identity Server 40 or Access Server 34. Translation Engine 272 selects an attribute entry in segment 280 corresponding to the current workflow step (step 410). Translation Engine 272 determines whether the attribute entry has a "Not Modified" state (step 412). If the state is Not Modified, Directory 36 is not updated—no update is necessary, since the value has not changed from the value in Directory 36.

If the state for attribute is different than "Not Modified," Translation Engine 272 determines whether the entry has a state of "Added" (step 414)—indicating that the attribute in the entry has been added to the profile during the workflow process. If the state is added, Translation Engine 272 adds the attribute to the identity profile in Directory 36 (step 416). Once the attribute is added (step 416) or it is determined that the entry does not have a state of "Added" (step 414), Translation Engine 272 updates the value for the selected attribute in Directory 36 (step 418)—loading the attribute in Directory 36 with the value from Attribute Value Field 322 in the selected attribute entry. Translation Engine 272 determines whether any attribute entries for the current workflow step remain unselected (step 420). If any attribute entries remain unselected, Translation Engine 272 selects another attribute entry (step 410) and repeats the above-described process. Otherwise, the process is complete.

FIGS. 9–14 describe the use of local data store 270 to maintain attribute values. In alternate embodiments, different data can be stored in local data store 270. Additionally, different embodiments can organize data based on something other than attributes. For example, data can be organized in local data store 270 in terms of identity profiles instead of attributes. Moreover, the process described above with reference to FIGS. 9–14 can be applied to other operations that occur in a series of steps, as opposed to workflows.

FIG. 15 is a flowchart describing the process of using a workflow. The process of FIG. 15 is performed, for example, when creating a new user, a new group, etc. The relevant manager (e.g. user, group or organization) receives a request to perform an action that requires a workflow (step 440). Most actions are likely to have an effect on at least one identity profile in the directory. It is determined whether this user is allowed to initiate the workflow (step 442). If not, the process of FIG. 15 is completed. If so, the GUI determines and reports a set of one or more workflows. This set of one or more workflows meets three criteria: (1) the user is allowed to use the workflows, (2) the workflows perform the requested task and (3) the workflows are associated with a domain that includes the target of the task. For example, if user A has requested to modify the attributes of Employee 8 (identity profile 164 of FIG. 3), then the system will identify and report workflows that (1) user A has permission to access, (2) perform attribute modification and (3) are associated with a domain that includes identity profile 164 of FIG. 3. In one embodiment, the identified workflows are displayed in a menu.

In some situations, a workflow is requested without knowing the location of the target identity profile. For example, a user can request to create an object without indicating where to store the object in the directory. In such a scenario, the system will find and report workflows that perform the requested task and can be accessed by the user. When the system reports the list of workflows (e.g. via a GUT), the system will also report the domain associated with each workflow. In this situation, step 446 includes the system receiving a selection from the user of the workflow desired, and the domain to operate on.

The system receives a selection from the user of the workflow desired (step 446). Note that if step 444 only identified one workflow, then step 446 can be skipped or performed automatically. It is determined whether the user is allowed to perform this workflow step (step 450). If not, the process of FIG. 15 is completed, at least temporarily. One embodiment of the process of FIG. 15 does not include step 450. If the user is allowed to perform the step, then an event catalog is accessed (step 452). The event catalog is a list of events that trigger actions external to the workflow. In one embodiment, the event catalog is only checked if a template allows for the use of external actions.

Pre-notifications, if any, defined in the workflow are sent out (step 454). The current step of the workflow is performed (step 458). In one implementation, process steps 350, 352, 354, 356, and 358 from FIG. 11 are performed during step 458. It is determined whether there are supplied variables (step 460). When creating a workflow, the creator had the option of defining the types of variables. Supplied variables are those variables whose value will be supplied by a subflow. If the current step has a supplied variable, then the system searches for any workflows that can supply the variable and apply to the appropriate domain. If only one workflow is found for each supplied variable, then those workflows are initiated as a subflow (step 462). If multiple workflows are found for a particular supplied variable, then the user is given a choice and the chosen workflow is initiated as a subflow (step 462). Note that the subflow could itself have a subflow, which could itself have a subflow, and so on. There is no limitation on the number of subflow nestings.

If there are no supplied variables, or after the subflow(s) are started, the event catalog is accessed (step 464). Step 464 is for post-step cross application workflows. In step 466, post step notifications are sent out, if any. The next step is accessed from the workflow definition (step 468). If there are no more steps, then the process of FIG. 15 is completed. The event catalog is checked (step 470), and pre-notifications are sent out (step 472).

The system determines whether the user is allowed to perform the next step (step 474). If not, the process of FIG. 15 is stopped. If so, the system determines whether it has to wait for the subflow(s) started in the previous workflow step (step 476). In one embodiment, a flag is set at workflow creation time to indicate that the workflow should wait or not wait. If there is a subflow and the current workflow has to wait, the system continues to wait until the subflow is completed. If there is no subflow or it does not have to wait, then the system determines whether all entry conditions have been satisfied (step 478). If not, the system waits for the entry conditions to be satisfied. If yes, the process continues to step 458.

Note that different steps may be set up for performance by different users. Thus, a first user may start the workflow but a different user or a different set of users may be needed for intermediate steps. Therefore, the process of FIG. 15 performed by the initial user may temporarily halt. As described above, if another user is needed to perform a step, that user will be notified either by e-mail or through one of the request tabs discussed above. When that user desires to perform the step, the user will request access to the workflow in step 484 of FIG. 15. For example, the user can respond to a link in an e-mail or select a workflow listed in one of the request tabs. In step 486, the step for that particular user is accessed, and then the method continues with step 474 of FIG. 15.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of limiting central data store access during a workflow, comprising the steps of:

(a) performing a function in a step of a workflow using information related to said workflow in a local data store; and (b) determining whether to update the central data store with information related to said workflow after performing said step (a) wherein determining whether to update the central data store is based on one or more entries in the information related to the workflow in the local data store.

2. A method according to claim 1, wherein it is determined in said step (b) to update said central data store if said workflow is complete.

3. A method according to claim 1, wherein it is determined in said step (b) to update said central data store if said workflow fails.

4. A method according to claim 1, wherein it is determined in said step (b) to update said central data store if an entity not performing said step (a) requires access to said information related to said workflow.

5. A method according to claim 1, wherein said step (b) is performed prior to performing another step in said workflow.

6. A method according to claim 1, wherein said method further includes the step of:

(c) updating a local data store with said information after performing said step (a).

7. A method according to claim 6, wherein said step (c) includes the step of:

(1) updating at least one attribute entry in said local data store.

8. A method according to claim 6, wherein said step (c) includes the steps of:

(2) selecting an attribute entry in said local data store; and (3) updating said attribute entry.

9. A method according to claim 8, wherein said step (c)(3) includes the step of:

(i) storing an Attribute Value in said attribute entry.

10. A method according to claim 9, wherein said step (c)(3) includes the step (ii) storing an Attribute State in said attribute entry.

11. A method according to claim 10, wherein said step (c)(3) includes the step of:

(iii) storing an Attribute Name in said attribute entry.

12. A method according to claim 8, wherein said step (c) includes the step of:

(4) determining whether to rollback an attribute associated with said attribute entry.

13. A method according to claim 12, wherein it is determined to rollback said attribute in said step (c)(4) and said method includes the step of:

(5) retrieving a rollback value from a second attribute entry in said local data store, wherein said step (c)(3) includes the step of:

(i) storing said rollback value in said attribute entry.

14. A method according to claim 6, wherein said method includes the step of:

(d) updating said central data store with said information related to said workflow after performing said step (c), if it is determined in said step (b) to update said central data store.

15. A method according to claim 14, wherein said step (d) includes the step of:

(1) selecting an attribute entry in said local data store; and (2) updating said central data store with information from said attribute entry selected in said step (d)(1).

16. A method according to claim 14, wherein said step (d) includes the step of:

(3) selecting an attribute entry in said local data store; and (4) updating said central data store with information from said attribute entry selected in said step (d)(3), if said attribute entry does not have an Attribute State of Not Modified.

17. A method according to claim 16, wherein said step (d)(4) includes the step of:

(i) adding an attribute to said central data store, if said attribute entry has an Attribute State of Added.

18. A method according to claim 16, wherein said step (d)(4) includes the step of:

(ii) modifying a value for an attribute in said central data store, if said attribute entry has an Attribute State of Modified.

19. A method according to claim 6, wherein said central data store is not updated with said information related to said workflow if it is determined in said step (b) not to update said central data store.

20. A method according to claim 1, wherein said method is performed as part of an Identity System.

21. A method according to claim 1, wherein said method is performed as part of an Access System.

22. A method according to claim 1, wherein said method is performed as part of an integrated Identity/Access System.

23. One or more processor readable storage devices having processor readable code embodied on said one or more processor readable storage devices, said processor readable code for programming one or more processors to perform a method comprising the steps of:

(a) performing a function in a step of a workflow using information related to said workflow in a local data store; and (b) determining whether to update the central data store with information related to said workflow after performing said step (a) wherein determining whether to update the central data store is based on one or more entries in the information related to the workflow in the local data store.

24. One or more processor readable storage devices according to claim 23, wherein said step (b) is performed prior to performing another step in said workflow.

25. One or more processor readable storage devices according to claim 23, wherein said method includes the step of:

(c) updating a local data store with said information related to said workflow after performing said step (a).

26. One or more processor readable storage devices according to claim 25, wherein said step (c) includes the step of:

(1) updating at least one attribute entry in said local data store.

27. One or more processor readable storage devices according to claim 25, wherein said step (c) includes the steps of:

(2) selecting an attribute entry in said local data store; and (3) updating said attribute entry.

28. One or more processor readable storage devices according to claim 27, wherein said step (c)(3) includes the steps of:

(i) storing an Attribute Value in said attribute entry; and (ii) storing an Attribute State in said attribute entry.

29. One or more processor readable storage devices according to claim 27, wherein said step (c) includes the step of:

(4) retrieving a rollback value from a second attribute entry in said local data store, wherein said step (c)(3) includes the step of:
(i) storing said rollback value in said attribute entry.

30. One or more processor readable storage devices according to claim 25, wherein said method includes the step of:
(d) updating said central data store with said information related to said workflow after performing said step (c), if it is determined in said step (b) to update said central data store.

31. One or more processor readable storage devices according to claim 30, wherein said step (d) includes the step of:
(1) selecting an attribute entry in said local data store; and
(2) updating said central data store with information from said attribute entry selected in said step (d)(1), if said attribute entry does not have an Attribute State of Not Modified.

32. One or more processor readable storage devices according to claim 25, wherein said central data store is not updated with said information related to said workflow if it is determined in said step (b) not to update said central data store.

33. One or more processor readable storage devices according to claim 23, wherein said method is performed as part of an Identity System.

34. One or more processor readable storage devices according to claim 23, wherein said method is performed as part of an Access System.

35. An apparatus, comprising:
one or more storage devices; and
one or more processors in communication with said one or more storage devices, said one or more processors performing a method comprising the steps of:
(a) performing a function in a step of a workflow using information related to said workflow in a local data store; and
(b) determining whether to update the central data store with information related to said workflow after performing said step (a) wherein determining whether to update the central data store is based on one or more entries in the information related to the workflow in the local data store.

36. An apparatus according to claim 35, wherein said method includes the step of:
(c) updating a local data store with said information related to said workflow after performing said step (a).

37. An apparatus according to claim 36, wherein said step (c) includes the steps of:
(1) selecting an attribute entry in said local data store; and
(2) updating said attribute entry.

38. An apparatus according to claim 37, wherein said step (c)(2) includes the steps of:
(i) storing an Attribute Value in said attribute entry; and
(ii) storing an Attribute State in said attribute entry.

39. An apparatus according to claim 36, wherein said method includes the step of:
(d) updating said central data store with said information related to said workflow after performing said step (c), if it is determined in said step (b) to update said central data store.

40. An apparatus according to claim 39, wherein said step (d) includes the steps of:
(1) selecting an attribute entry in said local data store; and
(2) updating said central data store with information from said attribute entry selected in said step (d)(1).

41. An apparatus according to claim 35, wherein said method is performed as part of an Identity System.

42. A method of limiting central data store access during a workflow, comprising the steps of:
(a) performing a first step of a series of steps, wherein said first step causes an attribute related to said series of steps to be Modified;
(b) updating an entry corresponding to said attribute in a local data store to reflect a modification of said attribute made during said first step; and
(c) performing a second step in said series of steps after performing said step (b), wherein an entry corresponding to said attribute in a central data store is not updated to reflect said modification of said attribute prior to performing said step (c).

43. A method according to claim 42, wherein said method includes the steps of:
(d) determining to update said central data store after said step (c) is performed; and
(e) updating said central data store with information from said entry corresponding to said attribute in said local data store.

44. A method according to claim 43, wherein said step (e) includes the step of:
(1) transferring an Attribute Value in said entry corresponding to said attribute in said local data store into said entry corresponding to said attribute in said central data store.

45. A method according to claim 44, wherein said series of steps is a workflow.

46. A method according to claim 42, wherein said method is performed as part of an Identity System.

47. A method according to claim 42, wherein said method is performed as part of an Access System.

48. One or more processor readable storage devices having processor readable code embodied on said one or more processor readable storage devices, said processor readable code for programming one or more processors to perform a method comprising the steps of:
(a) performing a first step of a series of steps, wherein said first step causes an attribute related to said series of steps to be Modified;
(b) updating an entry corresponding to said attribute in a local data store to reflect a modification of said attribute made during said first step; and
(c) performing a second step in said series of steps after performing said step (b), wherein an entry corresponding to said attribute in a central data store is not updated to reflect said modification of said attribute prior to performing said step (c).

49. One or more processor readable storage devices according to claim 48, wherein said method includes the steps of:
(d) determining to update said central data store after said step (c) is performed; and
(e) updating said central data store with information from said entry corresponding to said attribute in said local data store.

50. One or more processor readable storage devices according to claim 49, wherein said step (e) includes the step of:
(1) transferring an Attribute Value in said entry corresponding to said attribute in said local data store into said entry corresponding to said attribute in said central data store.

51. One or more processor readable storage devices according to claim 50, wherein said series of steps is a workflow.

52. One or more processor readable storage devices according to claim 48, wherein said method is performed as part of an Identity System.

53. An apparatus, comprising:
one or more storage devices; and
one or more processors in communication with said one or more storage devices, said one or more processors performing a method comprising the steps of:
(a) performing a first step of a series of steps, wherein said first step causes an attribute related to said series of steps to be Modified;
(b) updating an entry corresponding to said attribute in a local data store to reflect a modification of said attribute made during said first step; and
(c) performing a second step in said series of steps after performing said step (b), wherein an entry corresponding to said attribute in a central data store is not updated to reflect said modification of said attribute prior to performing said step (c).

54. An apparatus according to claim 53, wherein said method includes the steps of:
(d) determining to update said central data store after said step (c) is performed; and
(e) updating said central data store with information from said entry corresponding to said attribute in said local data store.

55. An apparatus according to claim 53, wherein said method is performed as part of an Identity System.

* * * * *